United States Patent [19]

Straub et al.

[11] 3,915,606

[45] Oct. 28, 1975

[54] EXTRUSION NOZZLE FOR PACKAGING MACHINES

[75] Inventors: Melvin J. Straub, Minnetonka; Thomas L. Schuette, Osseo, both of Minn.

[73] Assignee: Possis Corporation, Minneapolis, Minn.

[22] Filed: Jan. 14, 1974

[21] Appl. No.: 433,091

Related U.S. Application Data

[62] Division of Ser. No. 306,028, Nov. 10, 1972, Pat. No. 3,823,053, which is a division of Ser. No. 119,568, March 1, 1971, Pat. No. 3,755,523, which is a division of Ser. No. 842,991, July 18, 1969, Pat. No. 3,596,432.

[52] U.S. Cl. ............... 425/113; 425/376; 425/461
[51] Int. Cl.² ............................................. B29F 3/04
[58] Field of Search ......... 117/105.3; 156/500, 244; 118/303, 323; 425/461, 465, 466, 376, 115, 325, 66, 113, 131.1, 131.5, 209, 198, 101; 264/210 R, 259; 53/140

[56] References Cited
UNITED STATES PATENTS

| 893,796 | 7/1908 | Grant et al. | 425/325 X |
| 3,313,000 | 4/1967 | Hays | 425/461 |
| 3,595,722 | 7/1971 | Dawbarn | 156/244 X |
| 3,687,592 | 8/1972 | Miyamoto et al. | 425/461 X |

Primary Examiner—Robert D. Baldwin
Assistant Examiner—Mark Rosenbaum

[57] ABSTRACT

A packaging machine wherein a web of paperboard is continuously drawn along a defined path, under a loading device by which articles or products to be packaged are successively deposited upon the web to be carried thereby through a curtain or sheet of molten thermoplastic resin which debouches from a downwardly opening nozzle, to lay itself onto and form a covering film on the web and over any articles or products thereon. The mouth of the nozzle is a slit which extends transversely across the path of the web and is arched to have its ends close to the web while its mid-portion is spaced much farther from the web. The film covered web then travels across a vacuum chamber by which any space between the covering film and the web is evacuated and the film drawn tightly over the articles or products and against the web.

7 Claims, 10 Drawing Figures

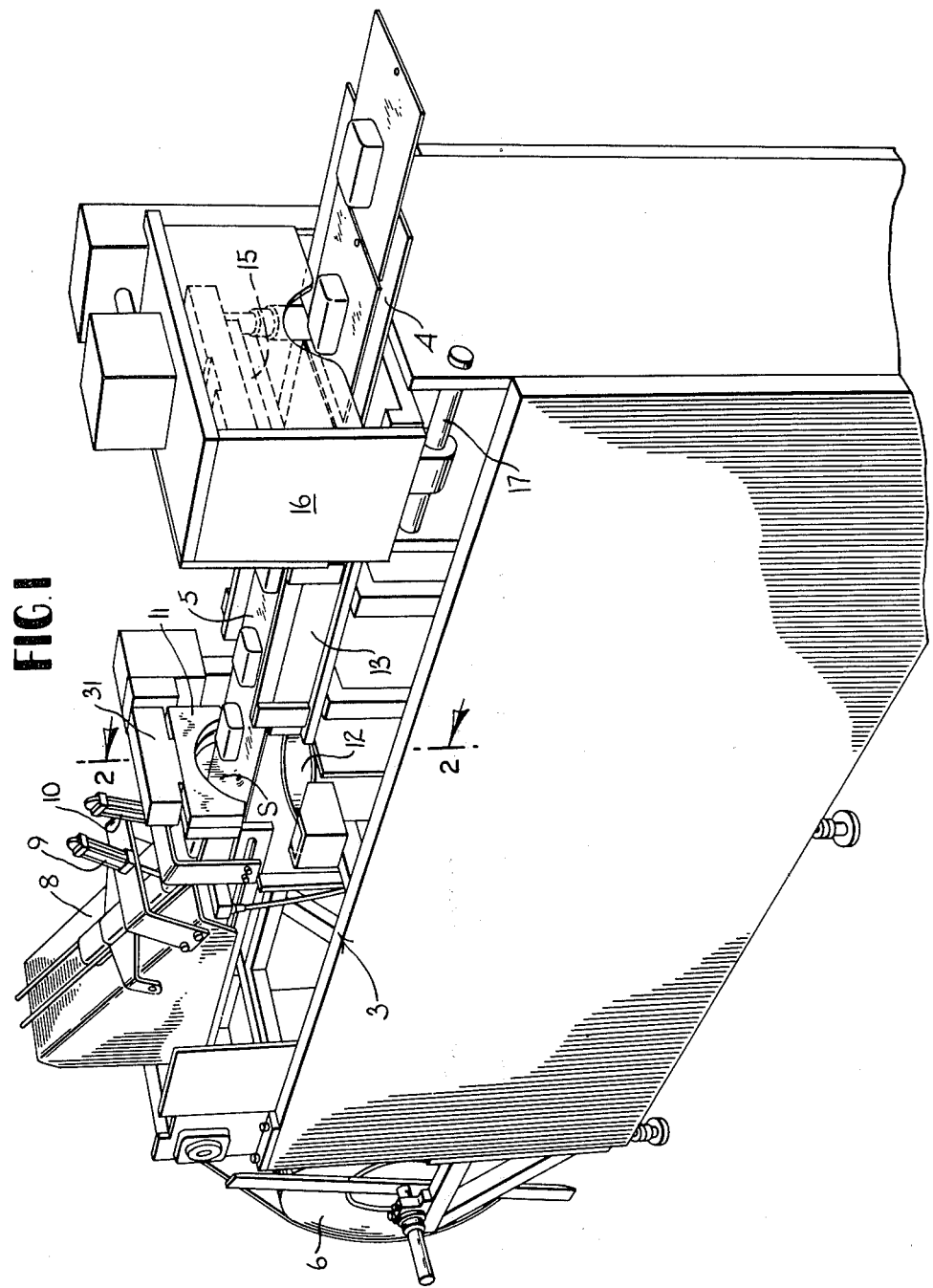

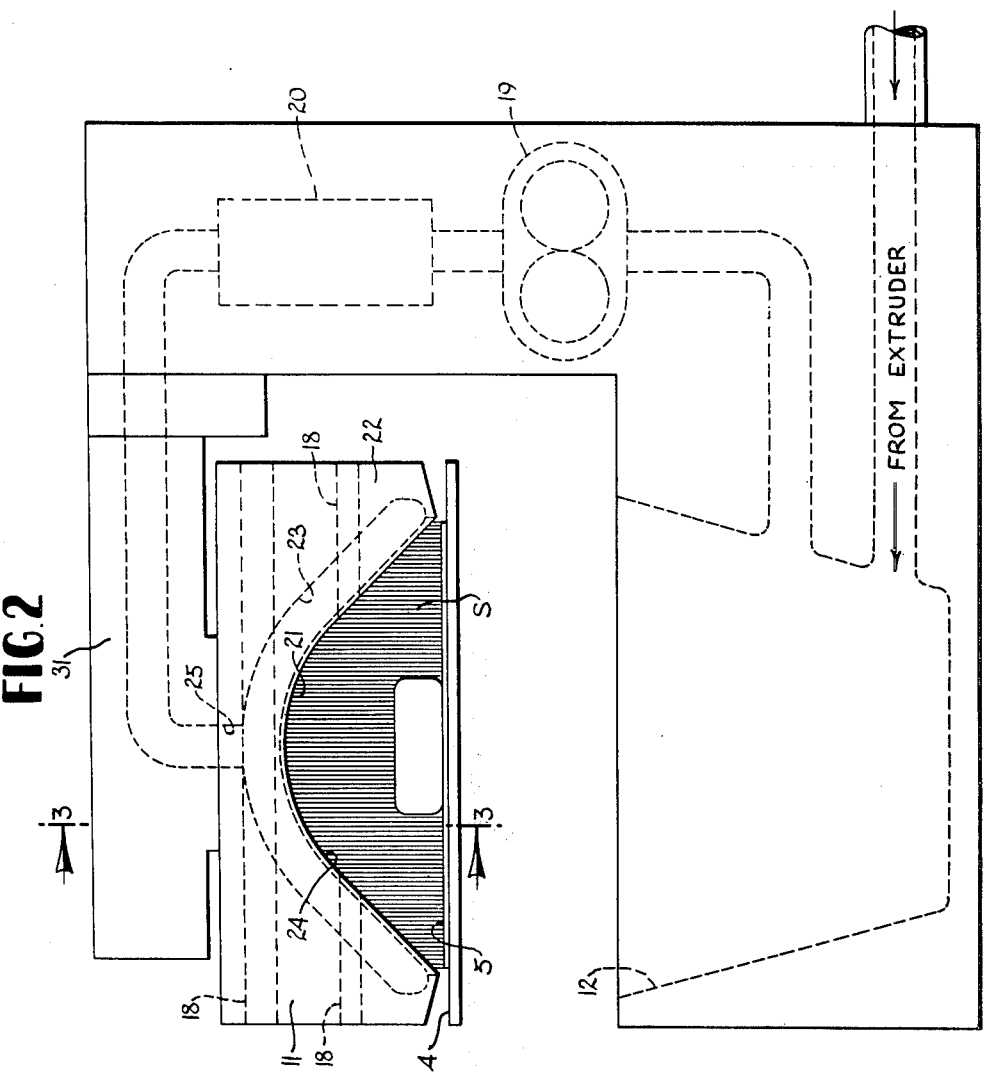
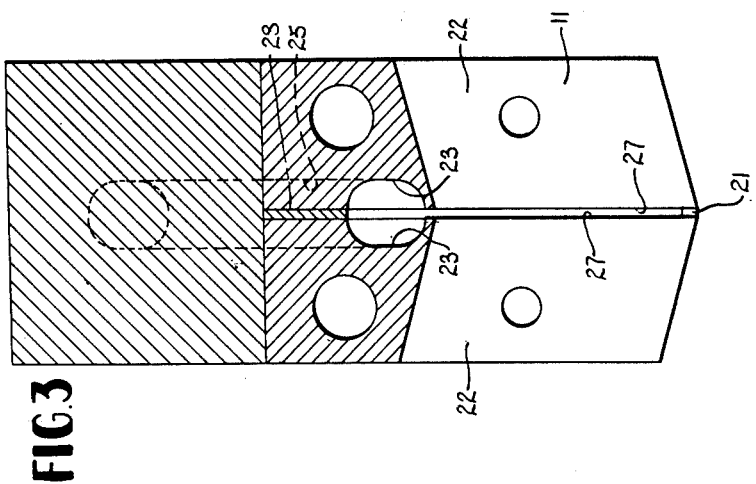

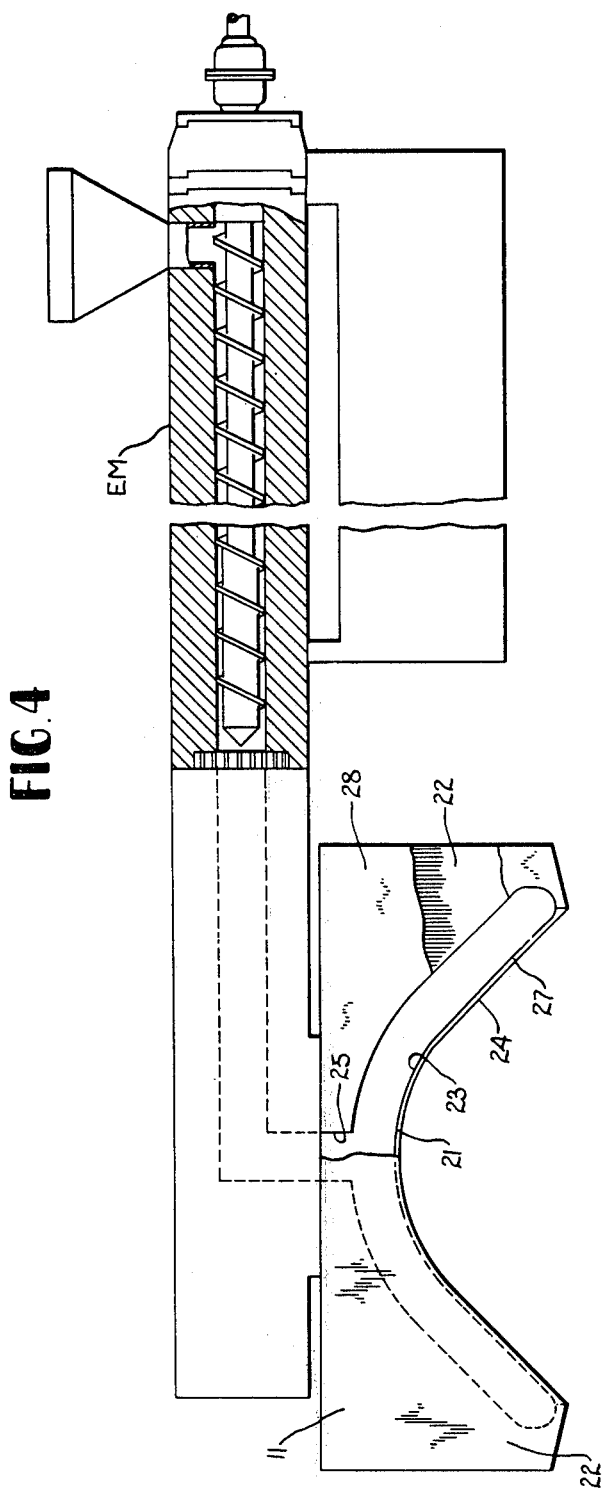

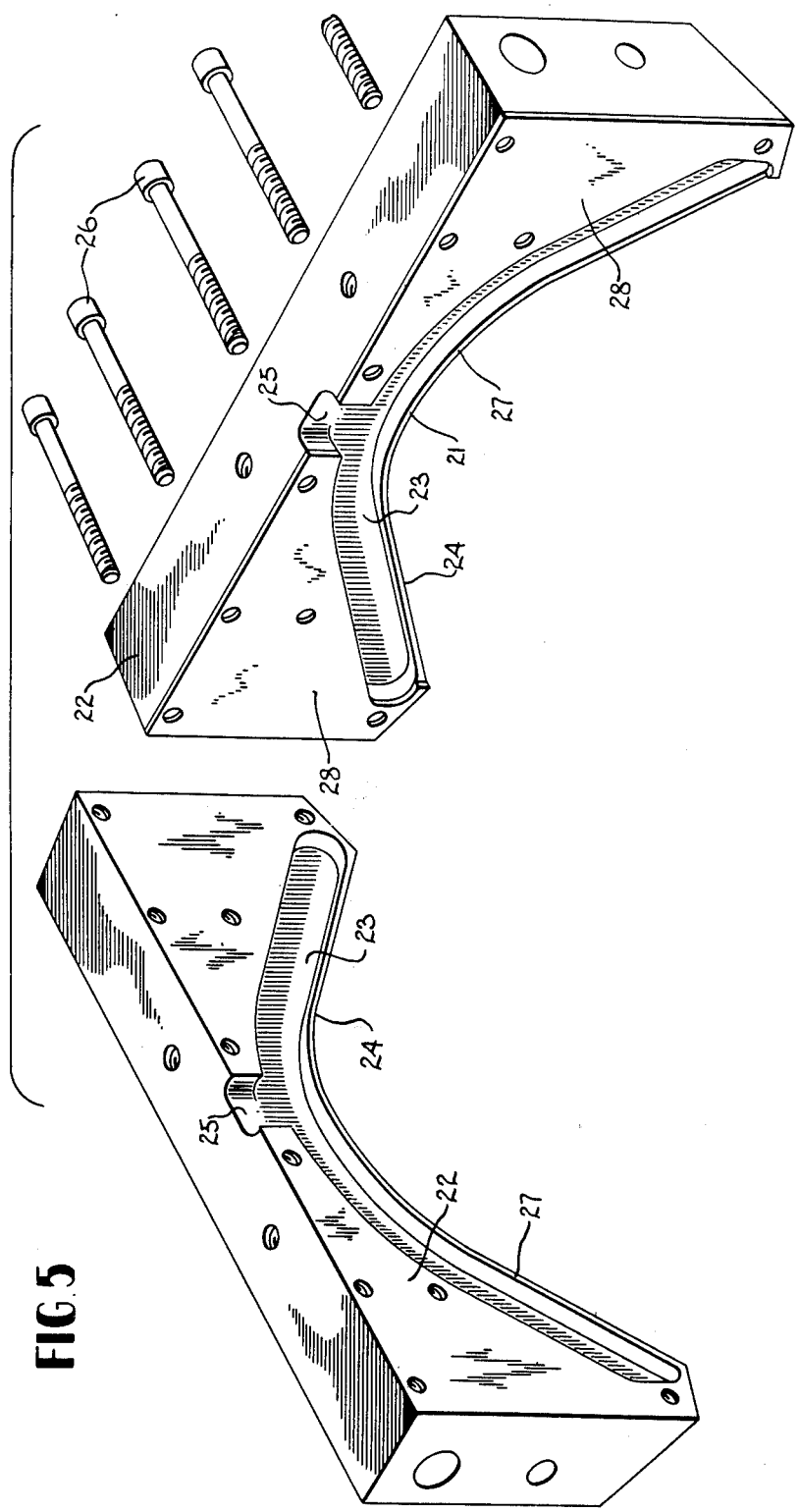

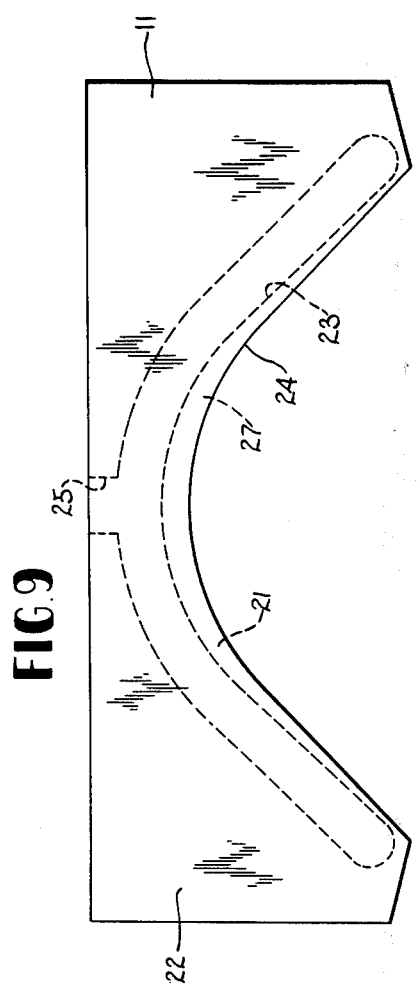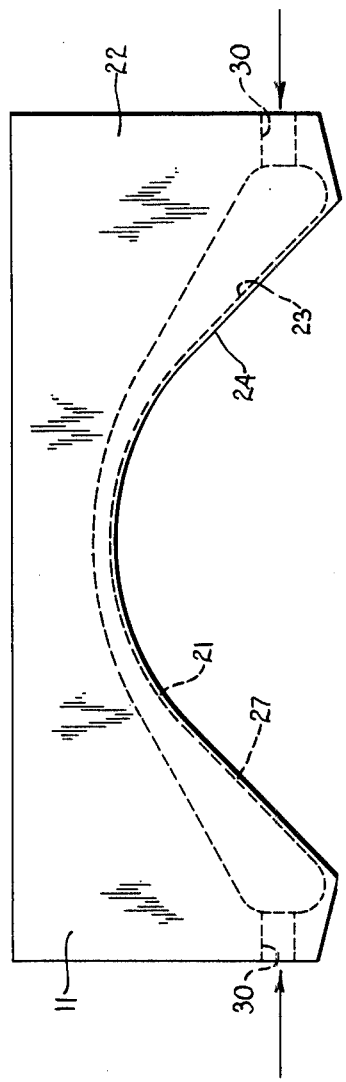

EXTRUSION NOZZLE FOR PACKAGING MACHINES

This invention, like that of the copending application Ser. No. 306,028, filed Nov. 10, 1972, of which this is a division, now U.S. Pat. No. 3,823,053, and which in turn was a division of Ser. No. 119,568, filed Mar. 1, 1971, now U.S. Pat. No. 3,755,523, which was filed as a division of Ser. No. 842,991, filed July 18, 1969, now U.S. Pat. No. 3,596,432, relates to a machine for packaging articles by the so-called "skin packaging" technique.

In the practice of this invention, the articles or products to be packaged are sequentially deposited upon a traveling substrate which may be a web of paperboard drawn from a roll, to be carried thereby through a descending curtain or sheet of liquid thermoplastic material debouching from the downwardly facing mouth of a nozzle. As the molten material contacts the web and the articles thereon, it forms a film that is drawn tightly over the articles and against the web by suction applied to the underside of the web at a zone directly downstream from the nozzle by which the curtain is formed, it being understood that the web is either inherently air permeable or specially made so.

The traveling web with the now covered articles thereon then passes through a cutting station where a "flying guillotine" severs the web to produce individual packages.

In the development of the machine of this invention, it was observed that the phenomenon known as "necking" - which is a convergent narrowing of the width of the curtain debouching from the nozzle, and which in the past was thought to be inescapable — caused the side edges of the ribbon of film laid onto the web to take a very irregular shape. To eliminate this unsightly result, it would be necessary to trim off the side edge portions of the finished packages, which or course would create waste and take time, unless some way of preventing necking could be found. This has been accomplished by the present invention.

One of the features of this invention stems from the discovery that if the elongated nozzle orifice from which the curtain of molten thermoplastic material issues, is arched or concave in its lengthwise dimension so that the ends of the nozzle can be brought close to the side portions of the web, while its middle is spaced far enough above the web to accommodate the articles or products being carried through the curtain issuing from the nozzle, the side edges of the applied film are straight and can be held directly contiguous to the edges of the substrate web.

But with the solution of the necking problem, another difficulty was encountered. The medial portion of the applied film did not lie flat along the length of the web, even when the web was devoid of articles or products, but instead was doubled or piled up on itself at spaced intervals. This objectionable condition known as "cascading" results from the wavering that is characteristic of a falling sheet or curtain of liquid resin. Because of it, the deposited material folds back and forth upon itself, unless the advance of the surface onto which the curtain is deposited and the volume of the material in the falling curtain are correctly coordinated. If the distance between the web and all portions of the nozzle orifice is uniform — which of course requires that the nozzle be straight — adjustment of the web speed is the easiest way of gaining the needed coordination. But the concave or arched nozzle shape rules out this obvious solution to the cascading problem.

Because of the arched shape of the nozzle, the distance the curtain drops or travels before it impinges upon the surface being coated is not uniform. It falls farther at the middle than it does at the side edges of the curtain. Hence, with the web speed correct for proper deposition of the film at the side edges, which is essential to the attainment of a neat package, it is too slow for proper disposition at the middle and this causes the objectionable cascading.

With a view toward eliminating this objectionable cascading, the invention which forms the basis for the present divisional application has as its object to incorporate flow controlling means directly in the nozzle, to assure that the volume of the material issuing from its mouth will be progressively greater along the length of the nozzle from its middle to its ends so that - despite the arched or concave shape of the nozzle mouth - cascading can be prevented by simply adjusting the speed of web travel.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

The accompanying drawings illustrate at least one complete example of the embodiment of the invention constructed according to the best mode so far devised for the practical application of the principles thereof, and in which:

FIG. 1 is a perspective view of the front side of the machine embodying this invention, viewing the same from its discharge end;

FIG. 2 is a cross sectional view through the machine on the plane of the line 2-2 in FIG. 1;

FIG. 3 is a cross sectional view through the curtain forming nozzle, on the plane of the line 3—3 in FIG. 2;

FIG. 4 is a view similar to FIG. 2 but showing an alternate way of delivering the molten thermoplastic material to the nozzle;

FIG. 5 is a perspective view of the two plates which together form the curtain forming nozzle, the plates being separated to illustrate their inner mating faces;

Figure 7:
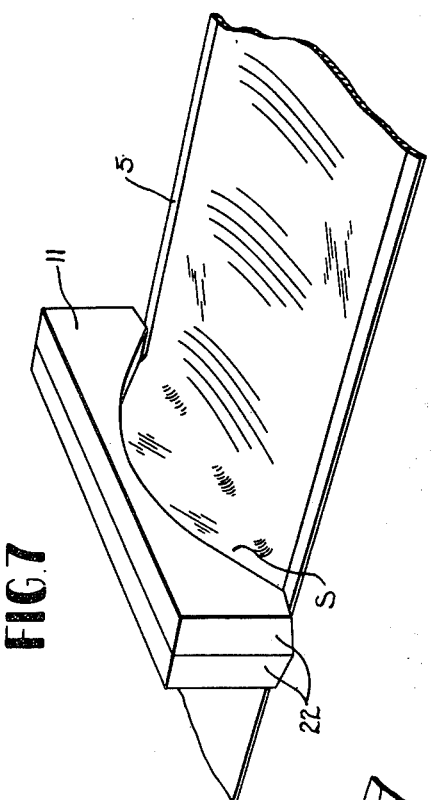
FIG. 7 is a perspective view showing a curtain or sheet of liquid resin issuing from the nozzle of this invention, but without the benefit of its feature that eliminates the cascading problem, and showing the effects of cascading on the covering film laid onto the traveling substrate.

FIG. 9 is a front view of the nozzle illustrating another way of gaining a difference in the volume of the material issuing from the nozzle at different locations along the length thereof to eliminate the cascading effect; and FIG. 10 is a front view of the discharge nozzle illustrating still another way of achieving a reduction in the volume of the material issuing from the middle portion of the nozzle as compared to that leaving its end portions.

THE MACHINE GENERALLY

Referring to the accompanying drawings, the numeral 3 designates the general frame structure of a packaging machine embodying this invention. The frame supports a table 4 over which a web 5 of paperboard may be drawn from a supply roll 6 suitably mounted at the loading end of the machine where an idler roll 7 guides the web onto the table. The web provides the substrate for the packages to be produced.

As the web travels along the table 4, it first passes under a loading chute 8 down which the articles or products to be packaged slide to be deposited on the web in regularly spaced sequence. The timing of their placement and the spacing of the articles or products on the web is controlled by a pair of pneumatically actuated plungers 9 and 10, the alternate actuation of which allows the articles or products to drop one at a time, at the right instant, from the bottom of the chute onto the web.

Downstream of the loading station the web passes under a nozzle 11 from which a curtain or sheet S of molten thermoplastic material debouches to lay itself onto the passing web and the articles or products thereon. As it does so, it congeals or solidifies and forms a film which covers the entire top surface of the web and, of course, any articles or products thereon. The thermoplastic material employed may be any one of several which lend themselves to the "skin packaging" technique. The useable materials are characterized by high molecular weight and a viscosity in excess of 20,000 centipoises in the molten condition. Included among such materials are polyolefins, cellulose esters, vinyl polymers, and the like. Among the preferred materials are cellulose acetate butyrate and cellulose acetate propionate because of their ease of handling and ability to produce a clear transparent film which greatly enhances the appearance of the finished package.

The table is interrupted beneath the nozzle 11 so that during warm-up periods before the web has been fed into the machine, or when for some reason or other no substrate is present under the nozzle, the molten resin extruded from the nozzle can drop into a melt tank or pot 12 located below the table level. Directly after passing under the nozzle 11, the coated web crosses a vacuum chamber or suction nozzle 13, the mouth of which faces upwardly and is wide enough to encompass the full width of the web. To enable subjecting the web to the negative pressure maintained in the vacuum chamber or suction nozzle, the table 4 is, of course, interrupted and its web supporting function is taken over by a series of closely spaced rollers that form a grid over the mouth of the vacuum chamber or suction nozzle.

The rollers are transverse to the web and at least some of them are power driven in the direction to draw the web off the roll and through the machine. Since the web is held down on the rollers by suction, the traction between the driven rollers and the web is quite adequate to assure a uniform rate of travel of the web at whatever speed the rollers are driven.

Inasmuch as the vacuum chamber or suction nozzle forms no part of the instant invention, its details are not illustrated in the drawings but can be obtained by reference to U.S. Pat. No. 3,596,432.

In accordance with the skin packaging technique which this invention follows, the web material is either inherently porous or air permeable, or is specially made so. Hence, the suction applied to its underside as the web passes over the vacuum chamber or suction nozzle draws the thermoplastic covering film tightly over the articles or products and against the web.

As is well known in the art, some of the previously identified thermoplastic materials in the molten state will adhere to the naked surface of ordinary paperboard stock, such as that known in the trade as "patent coated." This paperboard is only lightly calendared so as to preserve its inherently porous, gas-permeable nature. Its face or top layer is composed essentially of virgin pulp and high grade waste free of ground wood, and presents an attractive finish and appearance.

Where the chosen thermoplastic material is of the type that does not adhere readily to the naked surface of paperboard stock, the board is coated or suitably treated with an adhesive which has an affinity for the chosen thermoplastic. One example of the practice will be found in the Groth U.S. Pat. No. 2,855,735.

In any event, after the web has crossed the vacuum chamber or suction nozzle, the covering film should be securely adhered to it, and with this accomplished, only one operation remains to be performed by the machine. The web, with its plastic covered articles or products thereon, must be severed transversely between the successive articles or products thereon, to form separate units or pieces, each of which constitutes a complete package. This is done by a flying guillotine-type knife 15 located at the discharge end of the machine. A carrier 16 mounts the knife for up and down movement and the carrier rides on horizontal rails 17 that are fixedly secured to the frame of the machine. Suitable drive mechanism (not shown for sake of clarity) effects reciprocation of the carrier along the rails 17, and imparts up and down motion to the knife, in proper timed relation with the advance of the web.

If desired, a punch can be operated along with the knife, to provide a hanging hole in each package as it is cut from the web, and by the same token, the knife can be shaped to impart any desired configuration to the edges of the package.

Also, as will be readily understood, one or more slitting couples can be provided to slit the web into two or more strips before it reaches the flying guillotine knife 15. The provision of such slitters permits forming a plurality of packages with each operation of the flying guillotine knife, by simply loading the articles or products in sideby-side relation across the width of the web.

THE RESIN HANDLING SYSTEM

As best seen in FIG. 2, and as briefly mentioned before, a melt tank or pot 12 located beneath the nozzle 11 catches the descending curtain of molten plastic material whenever there is no substrate under the nozzle. The tank or pot, like the nozzle, is heated to keep the material molten. Electric heating elements 18 inserted into bores or pockets in the walls of the nozzle and the pot provide a convenient heat source for this purpose.

Obviously, of course, these heating elements are connected with a current source and are appropriately controlled to maintain a predetermined temperature, but for sake of clarity these details are not shown in the drawings.

During operation of the machine, a pump 19 diagrammatically illustrated in FIG. 2, draws molten thermoplastic material from the melt tank or pot and delivers it under pressure to the nozzle 11, it being understood that the ducts through which the material reaches the nozzle are suitably heated, and preferably the material is passed through a deaerator 20 like that of the Chenoweth U.S. Pat. No. 3,299,195 in its passage to the nozzle.

The system is kept supplied with thermoplastic material by periodically introducing fresh material into the melt tank or pot 12 by means of a conventional extruder, not shown, which, as is customary, has a hopper to receive the additional material, and also serves as a pre-melter so that by the time the fresh material reaches the melt tank it is almost in its molten state.

As an alternate for the material supply system just described, the more direct arrangement illustrated in FIG. 4 may be employed. In this system there is no pump and no melt tank. Instead, an extruder-melter unit EM converts the pelletized material that is loaded into the hopper of the unit into molten thermoplastic material and forces it into and from the nozzle. It is to be understood that the ducts leading to the nozzle are suitably heated and that the flow of molten plastic material to the nozzle can be terminated, if desired, by either stopping the extruder or providing a valve controlled by-pass for the material leaving the extruder. Since no melt tank or collecting hopper is employed in the alternate system, it is to be understood that no material would be delivered to the nozzle until the web has been started through the machine and was traveling under the nozzle.

THE EXTRUSION NOZZLE

The most significant aspect of the nozzle is the arched or concave shape of its bottom edge in which the mouth 21 of the nozzle is located. The nozzle mouth is a slit which extends for practically the entire length of the nozzle. Because of the arched or concave shape of the nozzle mouth its ends can be located quite close to the level of the table over which the web substrate travels, while the medial or middle portion thereof is spaced far enough above that level to permit unrestricted passage of the articles or products being packaged.

Figure 6:
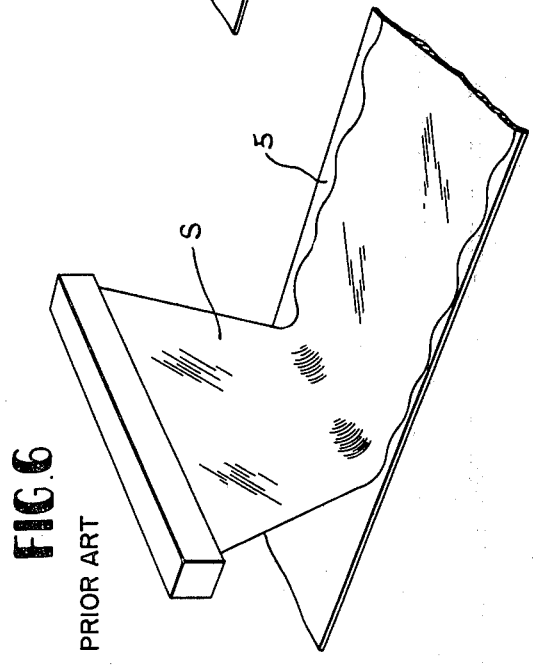
FIG. 6 is a perspective view showing a curtain or sheet of liquid resin issuing from a conventional slit-type discharge nozzle and illustrating the necking that occurs as the curtain descends and the irregularity in the edges of the applied film that results from the necking.

Because of the close proximity of the ends of the nozzle mouth to the level of the table, the thermoplastic material issuing therefrom has but a very short distance to travel before it impinges the web. Accordingly, the descending curtain reaches its destination, i.e., the passing web and the articles or products thereon, without being affected by the necking which characterizes falling curtains or sheets of liquid resin, and which is illustrated in FIG. 6. In fact, the curtain or sheet which debouches from the nozzle mouth 21 is practically devoid of necking, and because of this the side edges of the curtain do not waver toward and from one another. Accordingly the edges of the deposited film are straight and directly contiguous to the edges of the web, as shown in FIG. 7. Obviously, of course, for this desired contiguity to exist, the nozzle dimensions must comport with the width of the web.

The specific shape of the arch or concavity defined by the bottom edge of the nozzle while subject to modification, has been found to be very effective if the side portions of the arch are straight and at an angle of about 45° to the horizontal for a substantial distance and the medial or upper portion thereof has a compound curvature. With this formation the included angle between the straight side portions of the arched nozzle is 90°.

The nozzle is formed by joining two plates 22 which, as best seen in FIG. 5, are mirror images of one another. The mating inner faces of these plates have grooves 23 above their bottom edges 24 and leading from a groove 25 which opens to the top edge of the plates. Thus when the plates are secured together, as by cap screws 26, the grooves coact to provide a manifold passage which leads from an inlet formed by the grooves 25 to the mouth 21 of the nozzle.

The mouth of the nozzle is a slit between the lower edge portions or lands 27 of the plates which is that part thereof between the grooves 23 and the bottom edges of the plates. If the plates are in direct surface-to-surface engagement, it is of course necessary that the lands 27 be at a level or depth below that of the remaining flat inner faces of the plates in order to provide the slit.

Figure 8:
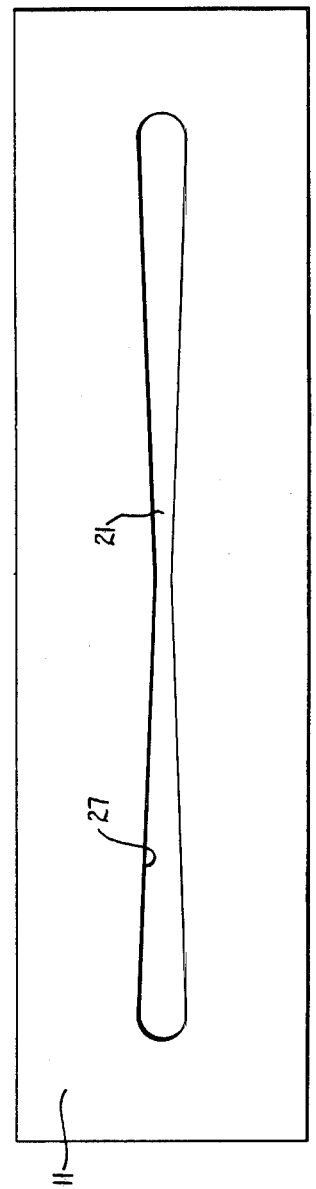
FIG. 8 is a bottom view of the discharge nozzle, illustrating in an exaggerated manner one way in which the volume of the material issuing from the nozzle can be controlled to eliminate the cascading problem.

Alternatively, as in the case in FIGS. 3, 4 and 5, shims 28 of a size and shape to cover all but the lower edge portions 27 of the plates and the grooves 25, can be clamped therebetween. The presence of these shims results in a nozzle mouth of uniform width for its entire length, and hence without some modification in that structure, the volume of the material issuing from different points along the length of the nozzle would not be achieved. For that purpose one of several things must be done. One way of doing so is to leave the lands 27 of uniform height from end to end of the nozzle, as they are in FIGS. 3, 4 and 5, but cut them to a progressively deeper level below the plane of the flat inner face of the plates, so that the slit which forms the mouth is wider at its ends than at its middle as shown in an exaggerated way in FIG. 8, where — for sake of clarity — the nozzle appears as a monolith. This difference in width of the nozzle mouth results in a greater volume of material flowing out of the ends than at the middle of the nozzle mouth. The same objective can be obtained by keeping the lands 27 parallel while increasing their height (in the direction of flow) from the ends of the slot towards its middle, as shown in FIG. 9, also in an exaggerated way.

Another way of gaining the needed difference in volume is illustrated in FIG. 10 wherein the lands defining the orifice are parallel and of uniform height. In this case, inlet ports 30 provide for the introduction of liquid resin simultaneously into both ends of a manifold chamber which decreases in cross section inwardly from both ends.

Still another way of achieving the aforesaid objective is to employ two sources of molten resin, one at a higher temperature, and hence lower viscosity, than the other. The latter is introduced into the central portion of the manifold and the lower viscosity material into the ends of the manifold.

Whichever approach is used to gain a difference in the volume of resin issuing from the nozzle along the length thereof, the important consideration is that, by virtue of that difference, cascading can be prevented by simply adjusting the rate of travel of the web, and by the same token, adjustment of the web speed can be used to regulate the thickness of the applied film.

The specific structure by which the nozzle 11 is supported and connected with the pump is a matter of design and not important to this invention, but for sake of completeness of the disclosure, the connected plates 22 are bolted to the underside of an arm 31 which in turn is supported on an upright pedestal, both of which units are provided with the passages necessary to conduct the material from the pump to the nozzle, and one of them may contain the deaerator 20.

From the foregoing description taken in connection with the accompanying drawings, it will be apparent to those skilled in this art that the nozzle of this invention is not only a tremendous boon to the packaging industry, but no doubt also can be used to advantage in other environments.

Those skilled in the art will appreciate that the invention can be embodied in forms other than as herein disclosed for purposes of illustration. The invention is defined by the following claims.

We claim:

1. Apparatus for discharging liquid resinous material in the form of a descending flowing sheet onto a flat substrate moving along a defined horizontal path, comprising:

a supply duct leading from a source of said liquid resinous material and having a discharge end; an extrusion nozzle having an inlet connected with the discharge end of said supply duct and an elongated narrow discharge mouth that is no wider at its center than at its ends and has a lengthwise concave shape, the extrusion nozzle being unobstructed from its inlet to its discharge mouth; and means mounting the discharge nozzle with its discharge mouth facing downward and above the horizontal path of the substrate and with its ends lying in a horizontal plane spaced a short distance above the horizontal path of the substrate so that material issuing from the ends of the nozzle mouth has a shorter distance to travel in reaching the flat substrate than material issuing from the medial portion of the nozzle mouth.

2. The extrusion nozzle of claim 1, wherein the concave discharge mouth has a curved middle portion and substantially straight end portions merging tangentially with the curved middle portion.

3. The extrusion nozzle of claim 2, wherein said substantially straight end portions of the nozzle mouth are disposed at approximately 90° to one another.

4. The extrusion nozzle of claim 1, further characterized by:

means incorporated in the nozzle for causing progressively different volumes of material to issue from the nozzle at different points along the length thereof, such that the volume of material issuing from the middle portion of the nozzle mouth is less than it is at the end portions of the nozzle mouth.

5. The nozzle of claim 4, wherein the mouth of the nozzle is a slit, and wherein said means for causing progressively different volumes of material to issue from the nozzle along the length thereof comprises means effecting a difference in the width of the slit along the length thereof with the slit width being least at the midpoint in the length of the slit and increasing towards the ends of the slit.

6. The nozzle of claim 4, wherein the nozzle has a manifold chamber communicating with the mouth of the nozzle throughout substantially its entire length, and the mouth of the nozzle is a slit with parallel flat side walls, and wherein said means for causing progressively different volumes of material to issue from the nozzle along the length thereof comprises a difference along the length of the slit in the height of its side walls, with said side walls being progressively higher from the ends of the slit towards its middle, so that greater frictional flow retardation exists at the middle of the concave nozzle than at its ends.

7. The nozzle of claim 4, wherein the nozzle has a manifold chamber communicating with the mouth of the nozzle throughout substantially its entire length, and the mouth of the nozzle is a slit with parallel flat side walls of uniform height, and wherein said means for causing progressively different volumes of material to issue from the nozzle along the length thereof comprises a difference along the length of the nozzle in the cross sectional area of the manifold chamber with said cross sectional area decreasing from the ends of the manifold chamber towards the middle thereof, and ports opening to both ends of the manifold chamber through which the material can be simultaneously introduced into the manifold chamber.

* * * * *